US010748194B2

(12) United States Patent
Assem Aly Salama et al.

(10) Patent No.: US 10,748,194 B2
(45) Date of Patent: *Aug. 18, 2020

(54) COLLABORATION GROUP RECOMMENDATIONS DERIVED FROM REQUEST-ACTION CORRELATIONS

(71) Applicant: International Business Machines Corporation, Armonk, NY (US)

(72) Inventors: Hitham A. Assem Aly Salama, Blanchardstown (IE); Al Chakra, Apex, NC (US); Jonathan D. Dunne, Dungarvan (IE); Liam S. Harpur, Skerries (IE)

(73) Assignee: International Business Machines Corporation, Armonk, NY (US)

( * ) Notice: Subject to any disclaimer, the term of this patent is extended or adjusted under 35 U.S.C. 154(b) by 206 days.

This patent is subject to a terminal disclaimer.

(21) Appl. No.: 15/895,909

(22) Filed: Feb. 13, 2018

(65) Prior Publication Data

US 2018/0174204 A1    Jun. 21, 2018

Related U.S. Application Data

(63) Continuation of application No. 14/752,919, filed on Jun. 27, 2015, now Pat. No. 9,916,605.

(51) Int. Cl.
*G06Q 30/02* (2012.01)
*H04L 29/08* (2006.01)
*G06Q 10/10* (2012.01)

(52) U.S. Cl.
CPC ....... *G06Q 30/0282* (2013.01); *G06Q 10/101* (2013.01); *H04L 67/22* (2013.01)

(58) Field of Classification Search
CPC ... G06Q 10/101; G06Q 30/0282; H04L 67/22
See application file for complete search history.

(56) References Cited

U.S. PATENT DOCUMENTS 7,280,977 B2   10/2007  Sengir et al.
8,812,527 B2    8/2014  Cleaver et al.
(Continued)

OTHER PUBLICATIONS

IBM, List of IBM Patents or Patent Applications Treated as Related, Applicant Appendix, Feb. 13, 2018, pp. 1-2, the contents of which are incorporated herein by reference in their entirety.

(Continued)

*Primary Examiner* — Ranodhi Serrao
(74) *Attorney, Agent, or Firm* — Tihon Poltavets

(57) ABSTRACT

In response to a user-initiated interaction request sent by a user using an electronic communication, subsequent actions performed by other users that received the user-initiated interaction request are analyzed. A determination is made as to whether the subsequent actions performed by the other users that received the user-initiated interaction request correlate to an intended interaction result of the user-initiated interaction request. A visual representation of a collaboration model that correlates probabilities of successful collaborations between the user and the other users is generated in accordance with determined correlations between the subsequent actions performed by the other users and the intended interaction result. A collaboration recommendation based upon a degree of correlation between the subsequent actions performed by the other users and the intended interaction result represented within the collaboration model is provided in association with the visual representation of the collaboration model.

12 Claims, 5 Drawing Sheets

(56) References Cited

U.S. PATENT DOCUMENTS

| | | |
|---|---|---|
| 2012/0215635 A1 | 8/2012 | Ramer et al. |
| 2012/0271831 A1 | 10/2012 | Narayanan et al. |
| 2014/0011595 A1 | 1/2014 | Muller |
| 2016/0379129 A1 | 12/2016 | Assem Aly Salama et al. |

OTHER PUBLICATIONS

Author Unknown, Collaborative filtering, Wikipedia, the free encyclopedia, wikipedia.org, Jun. 25, 2015, pp. 1-11, Wikimedia Foundation, Inc., Published online at: http://en.wikipedia.org/wiki/Collaborative_filtering.

William W. Cohen, Collaborative Filtering: A Tutorial, DIMACS Presentation, May 2004, pp. 1-119, Carnegie Mellon University, Published online at: http://www.cs.cmu.edu/~wcohen/collab-filtering-tutorial.ppt.

Xiaoyuan Su, et al., A Survey of Collaborative Filtering Techniques, Journal: Advances in Artificial Intelligence, Feb. 9, 2009, pp. 1-17, vol. 2009, Hindawi Publishing Company, Published online at: http://www.hindawi.com/journals/aai/2009/421425/.

Bart Goethals, Survey on Frequent Pattern Mining, Article, 2003, pp. 1-43, University of Antwerp, Published online at: http://adrem.ua.ac.be/~goethals/software/survey.pdf.

Author Unknown, Like Button for the Web, Webpage, Printed from website on Jun. 27, 2015, pp. 1-3, Facebook, Inc., Published online at: http://developers.facebook.com/docs/reference/plugins/like/.

Author Unknown, Google+, Wikipedia, the free encyclopedia, wikipedia.org, Jun. 24, 2015, pp. 1-16, Wikimedia Foundation, Inc., Published online at: http://en.wikipedia.org/wiki/Google%2B.

Author Unknown, Openlike, Website (English translation not available), openlike.org, Printed from website on Jun. 27, 2015, pp. 1-3, Published online at: http://openlike.org/.

Ranodhi N. Serrao, Examiner, United States Patent and Trademark Office, Office Action for U.S. Appl. No. 14/452,919, filed Jul. 3, 2017, pp. 1-16, Alexandria, VA, USA.

Ranodhi N. Serrao, Examiner, United States Patent and Trademark Office, Notice of Allowance for U.S. Appl. No. 14/452,919, filed Nov. 3, 2017, pp. 1-7, Alexandria, VA, USA.

COLLABORATION GROUP RECOMMENDATIONS DERIVED FROM REQUEST-ACTION CORRELATIONS

BACKGROUND

The present invention relates to collaboration group recommendations. More particularly, the present invention relates to collaboration group recommendations derived from request-action correlations.

Users of computing devices may utilize those devices to perform work, play games, send messages to other users, and for other purposes. Users may install and run different applications on the computing devices to perform these different types of functionality.

SUMMARY

A method includes analyzing, by a processor in response to a user-initiated interaction request sent by a user via an electronic communication, subsequent actions performed by other users that received the user-initiated interaction request; determining whether the subsequent actions performed by the other users that received the user-initiated interaction request correlate to an intended interaction result of the user-initiated interaction request; generating, in accordance with determined correlations between the subsequent actions performed by the other users that received the user-initiated interaction request and the intended interaction result of the user-initiated interaction request, a visual representation of a collaboration model that correlates probabilities of successful collaborations between the user and the other users; and providing, in association with the visual representation of the collaboration model, a collaboration recommendation based upon a degree of correlation between the subsequent actions performed by the other users that received the user-initiated interaction request and the intended interaction result of the user-initiated interaction request represented within the collaboration model.

A system that performs the method and a computer program product that causes a computer to perform the method are also described.

DETAILED DESCRIPTION

Figure 1:
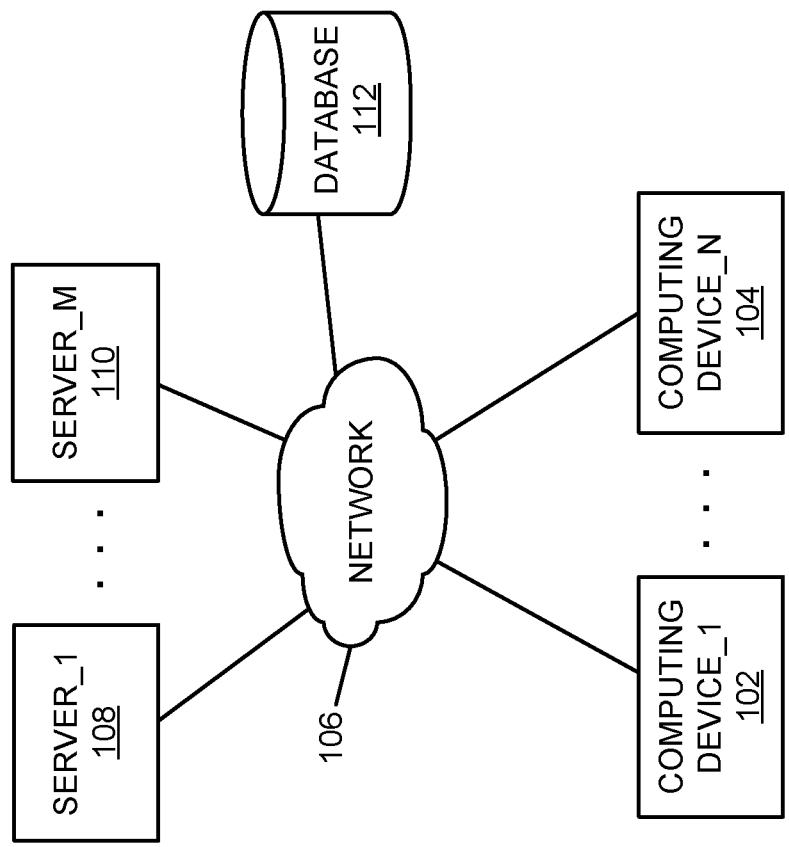
FIG. 1 is a block diagram of an example of an implementation of a system for collaboration group recommendations derived from request-action correlations according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides collaboration group recommendations derived from request-action correlations. The present technology solves a recognized collaboration group identification problem by providing technology that includes a new form of computational processing that evaluates subsequent actions of users in response to requests (e.g., inquiries for information, help, and other forms of requests) and that identifies collaborative group recommendations in accordance with identified correlations between the requests and the subsequent actions of users to which the requests have been issued.

The technology described herein operates by analyzing, in response to a user-initiated interaction request sent by a user via an electronic communication, subsequent actions performed by other users that received the user-initiated interaction request. A determination is made regarding whether the subsequent actions performed by the other users that received the user-initiated interaction request correlate to an intended interaction result of the user-initiated interaction request. In accordance with determined correlations between the subsequent actions performed by other users that received the user-initiated interaction request and the intended interaction result of the user-initiated interaction request, a visual representation of a collaboration model is generated that identifies probabilities of success regarding collaborations between the user and the other users. In association with the visual representation of the collaboration model, a collaboration recommendation is provided based upon a degree of correlation between the subsequent actions performed by other users that received the user-initiated interaction request and the intended interaction result of the user-initiated interaction request.

The technology described herein measures user/recipient responsiveness to requests of other users that are received by electronic communication, and measures a resulting effectiveness of different users (collaboration partners) in responding to the requests. This responsiveness information and effectiveness information represent datasets related to the respective individual users and collaboration groups. To extract information from these datasets, statistical models may be employed to identify trends within a given dataset that an individual user (e.g., a decision maker for a new collaboration attempt) may find useful for making a particular collaboration decision. These statistical models may further be useful to a temporal degree, particularly as the datasets grow and the scope of pattern matching widen. Under these circumstances, the technology described herein reduces the amount of processing to find real-time collaboration recommendation data that represents one or more possible collaborations with a high likelihood (e.g., degree, value, etc.) of being successful. Collaboration recommendations may be provided, using real-time recommendation data, based upon communications/interactions that are usable in real time for collaboration decision making.

As such, the technology described herein operates by determining, assessing, and measuring affinities within communication streams, the outcomes of these communication streams, whether the outcomes are positive or negative, and to what degree the outcomes were positive or negative. Metrics are accumulated from the communication streams and outcomes that identify a degree of success (outcome) of a prior interaction, and that identify how that degree of success influenced the requesting user and collaboration groups with which the user interacts. The requesting user may be shown in real time which other users and collaboration groups are more likely to be of benefit for future collaborations.

A requesting user is provided with recommendations according to a set of processing steps. These steps include gathering of communications (requests) from a user to other users and collaboration groups, and statistically analyzing the gathered communications to determine the outcome of the interactions between the user and the other collaboration partners and determine the subject matter that the communication involved.

A model derived from the gathered communications and statistical analysis may be used to determine which collaboration partners provide a more positive influence on the requesting user (e.g., help the most, etc.). The model may be further enhanced by aggregating which users and collaboration partners provide the most benefit within a particular field or subject matter area. The resulting models allow a real-time recommendation engine to identify and illustrate a recommended preferred set of collaboration partners and associated subject areas for consideration by a user that is interested in a new collaboration.

Several measures of influence may be utilized to identify one or more recommended collaboration partners. These measures may be quantified as the actions performed by a recipient following receipt of a communicated request. For example, a measure of a change in vocabulary usage by a receiver of a communication after having read the original communication may measure the level of influence that the requesting user has on the recipient. Another measure may be whether the receiving user forwards a received request to another user known by the recipient to be more knowledgeable in a particular subject matter area. A further measure may include whether the recipient responds to or performs any activity at all related to the request (which may be suggestive of a level of interest in the subject matter area, a level of knowledge on the particular topic, or an amount of time available to assist with the request, etc.). These and other types of actions by recipients after receiving a communicated request may be monitored to capture recommendation data used by the technology described herein to provide real-time collaboration recommendations.

This recommendation data may be captured for a subset of users or for all users within a collaboration network/organization. This recommendation data may be used to determine which users within a collaboration network are more likely to provide a positive influence/outcome for a requesting user. Collaboration models may be built/constructed from the analytics performed on the captured recommendation data.

Within the collaboration organization, groups of people with which to interact/collaborate may be identified in real time based upon a particular collaborative activity to produce a more positive outcome than would otherwise be possible without the technology described herein. Taking the real-time recommendation collaboration model further, groups of people may be identified as mentors and/or trainers for other individuals to improve business and/or personal productivity.

As described above, information related to user communications/requests and subsequent actions of recipients may be gathered. This information may be stored within a database or other form of memory and analyzed to determine the effectiveness of the subsequent actions of the recipients at assisting the requesting user with the user's collaboration interest/topic. These communication flows to/from the requesting user may be processed using statistical analysis to determine which subject matter areas and/or which collaboration partner(s) exhibited the most positive influence regarding the outcome/result for the requesting user. Processing of these communication flows may include analyzing the temporal real-time nature of these interactions, and predicting the success of future collaborations.

To help assess the collaborative actions of the involved parties (e.g., whether a particular collaboration partner contributes, declines to respond, or whether the parties are even associated with a subject matter area/topic), the messages and their associated subject matter area (e.g., a topic such as "audio design") may be monitored, and logs may be created that identify users to which the message is sent. That information may be collected across a group of users and may be evaluated to help ascertain potential collaboration effectiveness and compatibility among different users.

The following Table (1) illustrates a set of two predictive analytics based upon a set of communication flows including recommendation data that is gathered/captured in response to an evaluation of the communication flows. The Table (1) represents one form of a visual representation of a collaboration model that identifies probabilities of success regarding collaborations between a user and the other users.

TABLE (1)

Example Communication Flow Recommendation Data

| User | Subject Matter | Collaboration Partners | Process Contribution | Process Improvement | Successful Outcome |
|---|---|---|---|---|---|
| Tom | Audio Design | Ben | 50% | Yes | Yes |
|  |  | Mary | 30% | Yes | Yes |
|  |  | Pat | 20% | Yes | Yes |
| Frank | Encryption | Paul | 80% | Yes | No |
|  |  | Mark | 10% | Yes | No |
|  |  | Peter | 10% | No | No |

Table (1) shows two sets of derived recommendation data. The first set of recommendation data is related to a requesting user "Tom," and is related to the subject matter area "audio design." As can be seen from this first set of recommendation data, three collaboration partners are listed, specifically "Ben," "Mary," and "Pat." These collaboration partners have respectively contributed in accordance with previous requests and responses, and are thereby predicted based upon the derived analytics to contribute to future collaborations to a level of fifty percent (50%) for Ben, thirty percent (30%) for Mary, and twenty percent (20%) for Pat. A process improvement resulting from the collaboration is predicted for each of the three collaboration partners (e.g., "Yes"), and a successful outcome of the collaboration is predicted for each of the three collaboration partners (e.g., "Yes").

The second set of recommendation data is related to a requesting user "Frank," and is related to the subject matter area "encryption." As can be seen from this second set of recommendation data, three collaboration partners are also listed, specifically "Paul," "Mark," and "Peter." These collaboration partners respectively have contributed in accordance with previous requests and responses, and are thereby predicted based upon the derived analytics to contribute to future collaborations to a level of eighty percent (80%) for Paul, and ten percent (10%) for each of Mark and Peter. However, the process improvement results and outcome success predictions are shown to be different within the second set of recommendation data. As can be seen, a process improvement resulting from the collaboration is predicted for Paul and Mark (e.g., "Yes"), but a process improvement is not predicted to result from the interaction with Peter (e.g., "No"). Further, in all three interactions, the outcome of the collaboration is predicted to be unsuccessful for each collaboration partner (e.g., "No").

Using statistical inference, such as by use of a regression model and regression analysis, the information regarding the communication flows captured within Table (1) may be used to help plan for future collaborations. For example, using recommendation data gathered from a meeting between Tom and Ben/Mary/Pat at 10 am, a real-time determination may be made regarding how this interaction may influence Tom's communication with other people thereafter. Similarly, if Tom wants to advance his skills in audio design for the purposes of, for example, career building, Tom may elect work primarily with Ben and to a lesser extent with Mary and Pat.

Further, based upon the example information captured in Table 1, Frank appears to have had moderate success collaborating with Paul within the subject matter area of encryption, less success with Mark, and no success with Peter. Frank may be directed/recommended to work more with Paul and less with Mark and Peter given the lack of process improvement and the lack of a successful outcome from those interactions.

A collaboration model may be formed, and a visual (e.g., graphical) representation of these relationships may be provided as graphical data that may be used as part of a modeling workflow program or other user interface. The visual representation of the collaboration model may identify probabilities of success regarding collaborations between the user and the other users. An example visual representation of a collaboration model is illustrated and described further below in association with FIG. 3, which is deferred in favor of a description of system components and componentry.

It should be noted that conception of the present subject matter resulted from recognition of certain limitations associated with online-initiated technical collaborations (e.g., requests for information, help, etc.). For example, it was observed that users may engage in collaborations for business or personal matters, and that users often collaborate with heterogeneous groups of people in attempts to find the "right person" to assist with a particular issue or topic of interest. However, it was determined that the increasing complexity of online communications makes it difficult for users to understand how their requests for assistance on a particular topic are perceived by other users (e.g., whether a positive or negative response was invoked in the request recipients). It was further determined that where a particular request was positively acted upon by one or more other users, those types of user interactions may be beneficial for future collaborations, with a corresponding de-emphasis where a particular request was not acted upon or was only marginally acted upon by one or more other users. It was determined that new technology that analyzes response patterns of users and that provides users with information on the various degrees of user responsiveness to their requests may assist users in making better decisions when initiating future collaborations with others and may encourage responsiveness, creativity, and problem solving skills among the various collaborating users. It was further determined that this new technology would allow users of complex computing platforms to more effectively interact with other users and thereby increase their likelihoods of success in identifying contributors of merit for future collaborations. The present subject matter improves likelihoods of collaboration success by deriving collaboration group recommendations by correlations over time of user requests and corresponding actions by other users, as described above and in more detail below. As such, improved collaboration success may be obtained through use of the present technology.

The collaboration group recommendations derived from request-action correlations described herein may be performed in real time to allow prompt identification of collaboration recommendations for particular purposes using real-time recommendation data based upon communication/interactions to assist with decision making for user collaborations. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for collaboration group recommendations derived from request-action correlations. A computing device_1 102 through a computing device_N 104 communicate via a network 106 with several other devices. The other devices include a server_1 108 through a server_M 110. A database 112 provides storage accessible by the respective devices within the system 100, such as for data related to requests and subsequent actions, and analytics to identify correlations and to derive collaboration group recommendations.

As will be described in more detail below in association with FIG. 2 through FIG. 5, the computing device_1 102 through the computing device_N 104 may each provide automated collaboration group recommendations derived from request-action correlations. The automated collaboration group recommendations derived from request-action correlations is based upon determining correlations among sets of requests issued from one user to one or more other users, and the subsequent actions of the requested other user(s), to identify compatible relationships for future collaborations. The present technology may be implemented at a user computing device or server device level, or by a combination of such devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, an application server, or other data server device.

The database 112 may include a relational database, an object database, or any other storage type of device. As such, the database 112 may be implemented as appropriate for a given implementation.

Figure 2:
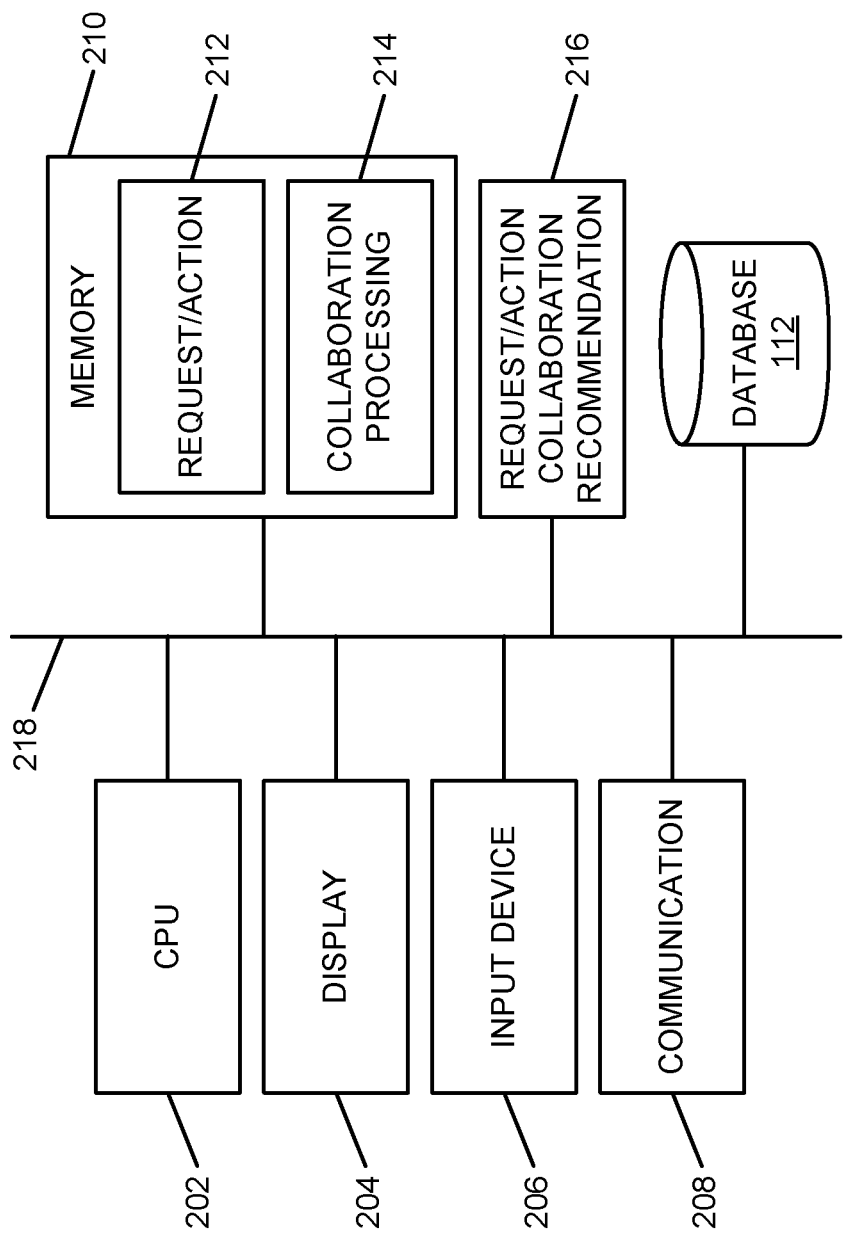
FIG. 2 is a block diagram of an example of an implementation of a core processing module capable of performing collaboration group recommendations derived from request-action correlations according to an embodiment of the present subject matter.

FIG. 2 is a block diagram of an example of an implementation of a core processing module 200 capable of performing collaboration group recommendations derived from request-action correlations. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of request/action analytics for use in forming collaboration group recommendations derived from request-action correlations in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a request/action storage area 212 that stores information usable to derive collaboration recommendations. The usable information may include initial user requests, subsequent actions of recipients of the requests, and other information in association with the core processing module 200. The memory 210 also includes a collaboration processing area 214 that provides processing space for analytics to derive collaboration recommendations.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A request/action collaboration recommendation module 216 is also illustrated. The request/action collaboration recommendation module 216 provides analytical processing of requests and subsequent actions, and derives future collaboration recommendations, for the core processing module 200, as described above and in more detail below. The request/action collaboration recommendation module 216 implements the automated collaboration group recommendations derived from request-action correlations of the core processing module 200.

It should also be noted that the request/action collaboration recommendation module 216 may form a portion of other circuitry described without departure from the scope of the present subject matter. The request/action collaboration recommendation module 216 may form a portion of an interrupt service routine (ISR), a portion of an operating system, or a portion of an application without departure from the scope of the present subject matter.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the request/action collaboration recommendation module 216, and the database 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
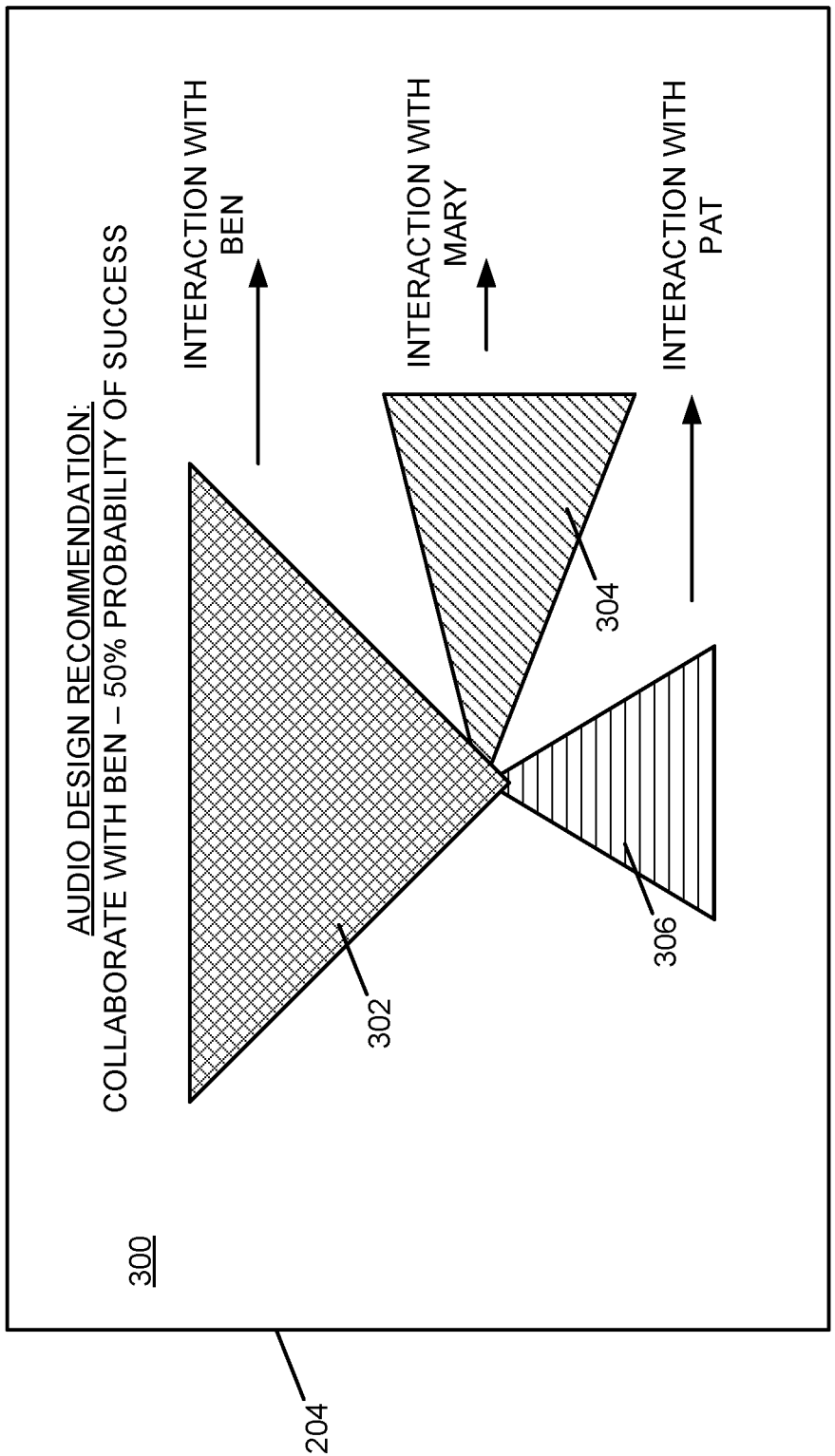
FIG. 3 is an illustration of an example of an implementation of a visual/graphical representation of a collaboration model according to an embodiment of the present subject matter.

FIG. 3 is an illustration of an example of an implementation of a visual/graphical representation of a collaboration model 300. The collaboration model 300 represents a graphical representation of relationships that may be displayed as graphical data and used, for example, as part of a career modeling workflow program. As described above, and in more detail below, user requests and subsequent actions of recipients of those requests may be monitored over time. Collaboration recommendations may be derived in accordance with the responsiveness and success of the subsequent actions of the recipients relative to the intended outcome of the requesting user. The collaboration recommendations may be provided to the user in a graphical form of the collaboration model 300, and the user may rapidly determine which interaction(s) with other users indicate a high probability for a successful conclusion related a particular type of collaboration objective.

It should be noted that the graphical collaboration model 300 illustrated in FIG. 3 is representative of a particular category of collaboration (e.g., audio design), though a different graphical collaboration model may be generated for each particular category of collaboration that is of interest to a particular user. It should also be noted that objects within the collaboration model 300 are not drawn to scale, though differences in sizes of the objects represent differences in determined probabilities of success based upon analysis of requests and subsequent actions, as noted above with respect to the first data set in Table (1).

As can be seen in FIG. 3, the display 204 is illustrated as rendering the visual/graphical representation of the collaboration model 300. For purposes of example, the collaboration model 300 is illustrated to represent one particular category of recommendation for collaboration (e.g., "AUDIO DESIGN RECOMMENDATION: COLLABORATE WITH BEN—50% PROBABILITY OF SUCCESS").

A graphic 302 represents predictions regarding an interaction with Ben within the particular category of collaboration recommendation of audio design. The graphic 302 is illustrated as a largest graphic within the collaboration model 300 and is shown to be rendered in a highest position within the collaboration model 300, which represents that the fifty percent (50%) predicted likelihood of success based upon previous requests and subsequent actions, is the largest value of the three values, as described above in association with Table (1).

Similarly, a graphic 304 represents predictions regarding an interaction with Mary within the particular category of collaboration recommendation of audio design, again noted to be thirty percent (30%) in association with the description of Table (1). A graphic 306 represents predictions regarding an interaction with Pat within the particular category of collaboration recommendation of audio design, again noted to be twenty percent (20%) in association with the description of Table (1).

The graphic 304 is illustrated with a size smaller (again not to scale) than the graphic 302 to illustrate the smaller probability of success of collaborations with Mary than with Ben. Further, the graphic 306 is illustrated with a size smaller (again not to scale) than the graphic 304, and as such the graphic 302 also, to illustrate the smaller probability of success of collaborations with Pat than with Mary, and with Ben.

As such, the resulting recommendation may be seen from FIG. 3 to represent that a "primary" interaction recommendation for collaboration for audio design is with Ben. Similarly, a "secondary" interaction recommendation for collaboration with Mary and Pat is provided, such as if time permits in view of the details above that collaboration is still predicted to be successful where Mary and Pat are included in a collaboration, and perhaps even more successful overall, again time permitting.

The different shadings illustrated within FIG. 3 for the graphic 302, the graphic 304, and the graphic 306 also represent highlighting that may be used to draw the user's attention to the degree of compatibility of the particular recommendations surfaced within the collaboration model for the particular category (again "audio design" for purposes of example). It should be noted that the highlighting may include color rather than drawing line shapes, or otherwise as appropriate for a given implementation. For example, the graphic 302 may be rendered in the color green to represent a high degree of predicted compatibility for collaborations. Similarly, the graphic 304 may be rendered in blue to show the relative difference/decrease in degree of predicted compatibility for collaborations. The graphic 306 may be rendered in yellow to show the further decreased relative degree of predicted compatibility for collaborations. It should be noted that the example line shading patterns and colors described above are for purposes of example only, and should not be considered limiting in any manner. The present technology may be implemented in view of the description herein as appropriate for the given implementation.

Figure 4:
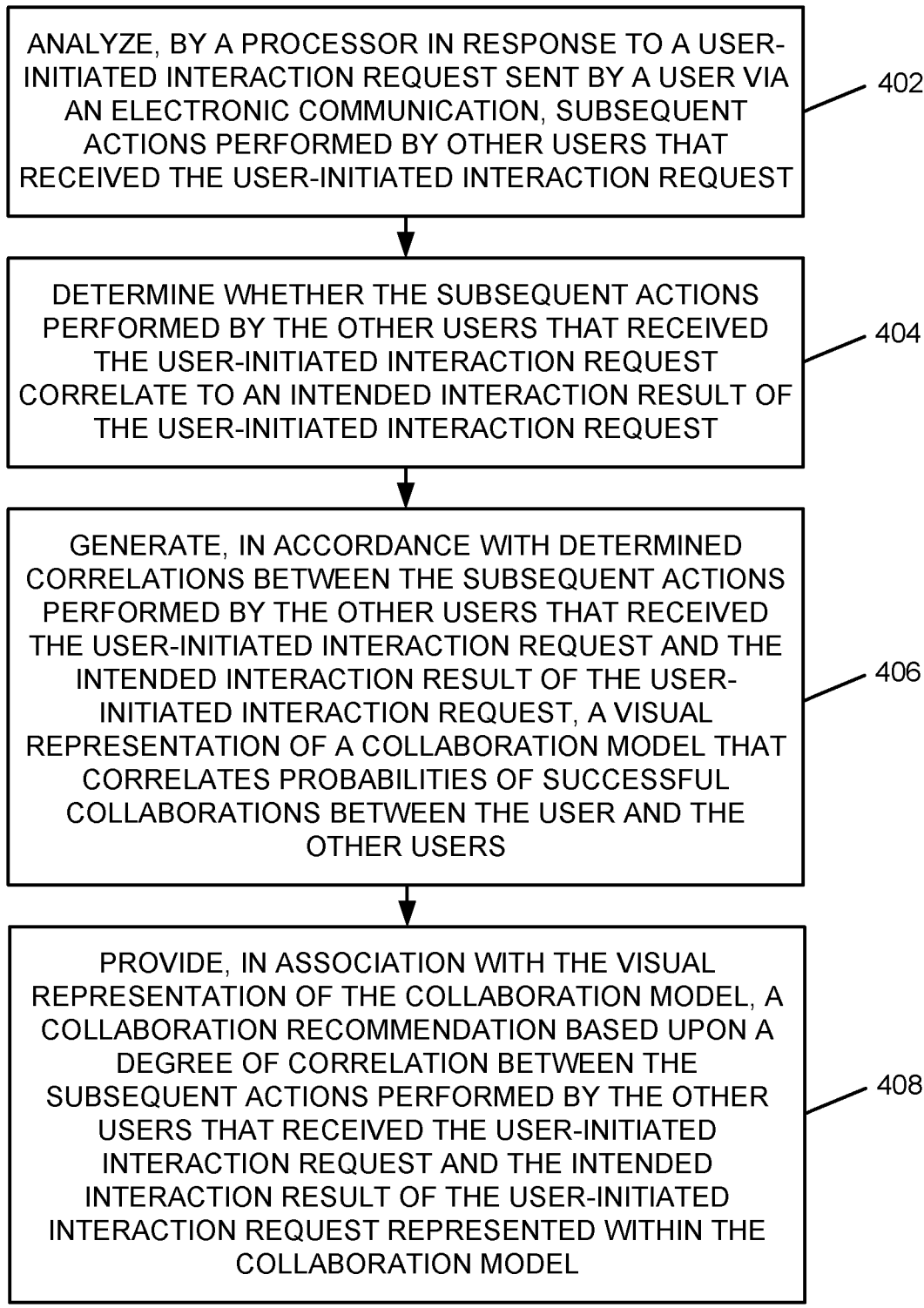
FIG. 4 is a flow chart of an example of an implementation of a process for collaboration group recommendations derived from request-action correlations according to an embodiment of the present subject matter.
Figure 5:
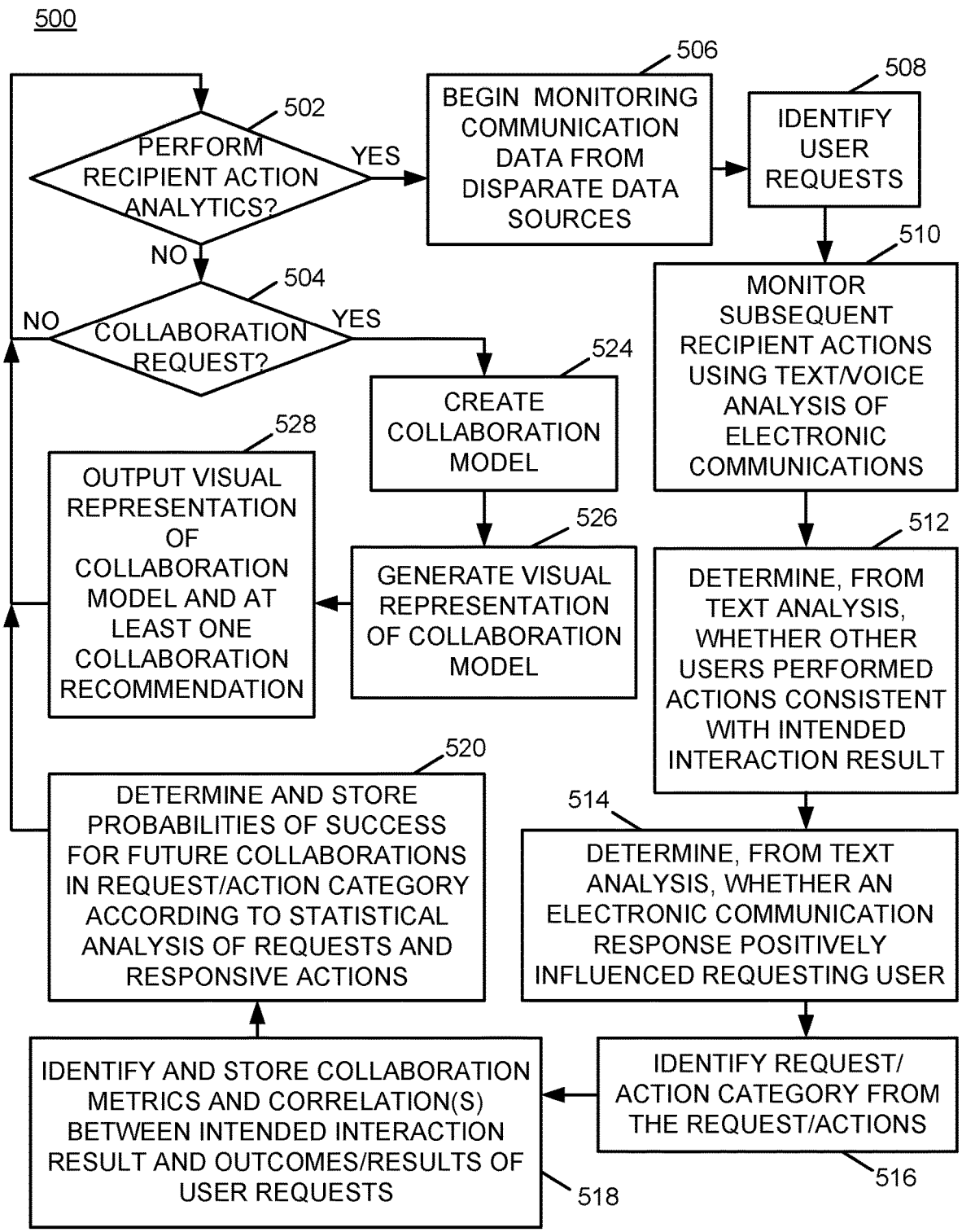
FIG. 5 is a flow chart of an example of an implementation of a process for collaboration group recommendations derived from request-action correlations that includes both electronic communication analysis and collaboration recommendations according to an embodiment of the present subject matter.

FIG. 4 through FIG. 5 described below represent example processes that may be executed by devices, such as the core processing module 200, to perform the automated collaboration group recommendations derived from request-action correlations associated with the present subject matter. Many other variations on the example processes are possible and all are considered within the scope of the present subject matter. The example processes may be performed by modules, such as the request/action collaboration recommendation module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 4 is a flow chart of an example of an implementation of a process 400 for collaboration group recommendations derived from request-action correlations. The process 400 represents a processor-implemented method of performing the derived collaboration recommendations from request-action patterns as described herein. At block 402, the process 400 analyzes, by a processor in response to a user-initiated interaction request sent by a user via an electronic communication, subsequent actions performed by other users that received the user-initiated interaction request. At block 404, the process 400 determines whether the subsequent actions performed by the other users that received the user-initiated interaction request correlate to an intended interaction result of the user-initiated interaction request. At block 406, the process 400 generates, in accordance with determined correlations between the subsequent actions performed by the other users that received the user-initiated interaction request and the intended interaction result of the user-initiated interaction request, a visual representation of a collaboration model that correlates probabilities of successful collaborations between the user and the other users. At block 408, the process 400 provides, in association with the visual representation of the collaboration model, a collaboration recommendation based upon a degree of correlation between the subsequent actions performed by the other users that received the user-initiated interaction request and the intended interaction result of the user-initiated interaction request represented within the collaboration model.

FIG. 5 is a flow chart of an example of an implementation of a process 500 for collaboration group recommendations derived from request-action correlations that includes both electronic communication analysis and collaboration recommendations. The process 500 represents a processor-implemented method of performing the derived collaboration recommendations from request-action patterns as described herein. At decision point 502, the process 500 begins higher-level iterative processing by making a determination as to whether to perform recipient action analytics. As described above, recipient actions responsive to detected receipt of user requests may be analyzed to determine recipient responsiveness of other users received by electronic communication and to determine responsiveness and effectiveness information usable to identify collaboration groups. Recipient action analytics may be used to determine recommendations for collaboration groups responsive to collaboration requests. Affirmative processing responsive to a determination to perform recipient action analytics will be described in detail further below. As such, in response to determining not to perform recipient action analytics (e.g., where the analytics have already been performed), the process 500 makes a determination at decision point 504 as part of the higher-level iterative processing as to whether a collaboration request from a user has been detected. A collaboration request from a user may include a collaboration topic or category for purposes of the present description. A collaboration recommendation may be generated responsive to a user collaboration request based upon information derived from performing the recipient action analytics, and affirmative processing responsive to a collaboration request will also be described further below. As such, in response to determining at decision point 504 that a collaboration request has not been detected, the process 500 returns to decision point 502 and iterates as described above.

Returning to the description of decision point 502, in response to determining to perform recipient action analytics, the process 500 begins monitoring communication data from disparate data sources at block 506. The disparate data sources may include, among others, web conferences, instant messaging (IM), electronic mail (email) messages, and other forms of data sources. The monitoring may include text analysis of written communications, voice analysis of web conferences, and other forms of monitoring as appropriate for a given implementation.

At block 508, the process 500 identifies user requests within the disparate data sources. The user requests may be considered user-initiated interaction requests. Identification of user requests may also include a determination of one or more intended interaction results of a user-initiated interaction request. It should be understood that the processing to monitor data sources and identify user requests is considered to be iterative, and the subsequent description operates responsive to each such user request.

At block 510, the process 500 monitors subsequent recipient actions, using text and/or voice analysis of electronic communications. For example, responses may be monitored to capture information with respect to whether the recipients responded to the request, dismissed the request, or performed some other action.

At block 512, the process 500 determines, from text (and/or voice) analysis of electronic communications initiated by the other users after receipt of the user-initiated interaction request, whether the other users performed actions consistent with the intended interaction result of user-initiated interaction request and a degree of assistance provided to the requesting user. The actions may include providing an informative response or other actions as appropriate for a given implementation.

At block 514, the process 500 determines, from text (and/or voice) analysis of subsequent electronic communications initiated by the user after receipt of an electronic communication response from at least one of the other users, whether the response positively influenced the user that sent the user-initiated interaction request. For example, a positive influence on a requesting user may include the user following a hypertext link (e.g., a uniform resource locator (URL)) provided by a colleague responsive to the user's request for assistance, or another form of action that is detectable in response to the response.

At block 516, the process 500 identifies a request/action category from the requests and subsequent actions of the recipients. The request/action category may include, for each particular request/action set, one or more of topics, subject matter areas, or other forms of categories usable to identify collaboration requests.

At block 518, the process 500 identifies and stores, such as within the memory 210 or the database 112, collaboration metrics between the intended interaction results and the outcomes/results of the requests. For example, the process 500 may identify collaboration metrics that specify a likelihood of success of future collaborations between the user and at least one of the other users that received the user-initiated interaction request.

At block 520, the process 500 determines and stores probabilities of success for future collaborations in the identified request/action category according to the statistical analysis of the requests and responsive actions of other users. For example, the process 500 may perform statistical analysis on the outcomes/results of the user request (e.g., the requests and responsive actions of other users), and any actions performed by the requesting user in response to receiving a response to the request. The process 500 returns to decision point 502 and iterates as described above.

Returning to the description of decision point 504, as described above, a collaboration request from a user may include a collaboration topic or category for purposes of the present description. In response to determining at decision point 504 that a collaboration request from a user has been detected, the process 500 creates a collaboration model at block 524. For example, the collaboration model may be constructed according to the topic associated with the collaboration request by correlating the collaboration metrics derived from previous user requests (of the same or a different user) and responsive actions performed by recipients of the user requests. The collaboration metrics identify probabilities of successful collaborations between the user and the other users. The collaboration model may include users, collaboration partners, process contributions, determinations of process improvement, and the probabilities of success assigned to the respective collaboration partners. The collaboration model may further include multiple categories where multiple categories or topics are received in association with the collaboration request.

At block 526, the process 500 generates a visual representation of the collaboration model. The process 500 may generate the visual representation of the collaboration model that identifies probabilities of successful collaborations between the user and the other users in accordance with determined correlations between the subsequent actions performed by other users that received the (previous) user-initiated interaction request and the intended interaction result of the user-initiated interaction request. The visual representation may further include a collaboration recommendation that specifies a probability of success for a future collaboration between users identified in the collaboration recommendation. The visual representation of the collaboration model may be generated as one of a graphical representation of the collaboration model, a table, a listing, or other visual representation that respectively identifies information within the collaboration model.

At block 528, the process 500 outputs the visual representation of the collaboration model and at least one collaboration recommendation. Outputting of the visual representation of the collaboration model and at least one collaboration recommendation may include rendering the visual representation of the collaboration model and recommendation(s) on a display, such as the display 204, may including sending the visual representation/recommendation(s) to another device for rendering, or otherwise as appropriate for a given implementation. The process 500 returns to decision point 502 and iterates as described above.

As such, the process 500 performs analytics on electronic communications from disparate data sources over time to identify requests from users and subsequent actions performed by recipients of the requests. Collaboration metrics are derived in accordance with statistical analysis of the requests/actions. Collaboration requests are processed by generating a collaboration model including one or more topics/categories of requested collaborations, displaying a visual (e.g., graphical) representation of the collaboration model, and displaying at least one collaboration recommendation to the requesting user.

As described above in association with FIG. 1 through FIG. 5, the example systems and processes provide collaboration group recommendations derived from request-action correlations. Many other variations and additional activities associated with collaboration group recommendations derived from request-action correlations are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
   determining, by a processor based on an analysis of subsequent actions performed by other users that received a user-initiated interaction request, whether the subsequent actions performed by the other users that received the user-initiated interaction request correlate to an intended interaction result of the user-initiated interaction request;
   creating a collaboration model by correlating identified collaboration metrics that specify probabilities of success of future collaboration between the user and the other users that received the user-initiated interaction request;
   generating, in accordance with determined correlations between the subsequent actions performed by the other users that received the user-initiated interaction request and the intended interaction result of the user-initiated interaction request, a visual representation of the collaboration model that correlates the probabilities of success of the future collaborations between the user and the other users; and
   providing, in association with the visual representation of the collaboration model, a collaboration recommendation based upon a degree of correlation between the subsequent actions performed by the other users that received the user-initiated interaction request and the intended interaction result of the user-initiated interaction request represented within the collaboration model.

2. The method of claim 1, where determining whether the subsequent actions performed by the other users that received the user-initiated interaction request correlate to the intended interaction result of the user-initiated interaction request comprises determining, from text analysis of electronic communications initiated by the other users after receipt of the user-initiated interaction request, whether the other users performed actions consistent with the intended interaction result of the user-initiated interaction request.

3. The method of claim 1, where determining whether the subsequent actions performed by the other users that received the user-initiated interaction request correlate to the intended interaction result of the user-initiated interaction request comprises determining, from text analysis of a subsequent electronic communication initiated by the user after receipt of an electronic communication response from at least one of the other users, whether the electronic communication response influenced the user that sent the user-initiated interaction request.

4. The method of claim 1, where generating, in accordance with the determined correlations between the subsequent actions performed by the other users that received the user-initiated interaction request and the intended interaction result of the user-initiated interaction request, the visual representation of the collaboration model that identifies the probabilities of successful collaborations between the user and the other users comprises:

generating one of a graphical representation of the collaboration model and a table, where the generated one of the graphical representation of the collaboration model and the table identifies information within the collaboration model.

5. A system, comprising:

a display device; and a processor programmed to:

determine, based on an analysis of subsequent actions performed by other users that received a user-initiated interaction request, whether the subsequent actions performed by the other users that received the user-initiated interaction request correlate to an intended interaction result of the user-initiated interaction request;

create a collaboration model by correlating identified collaboration metrics that specify probabilities of success of future collaboration between the user and the other users that received the user-initiated interaction request;

generate on the display, in accordance with determined correlations between the subsequent actions performed by the other users that received the user-initiated interaction request and the intended interaction result of the user-initiated interaction request, a visual representation of the collaboration model that correlates the probabilities of success of the future collaborations between the user and the other users; and provide, in association with the visual representation of the collaboration model, a collaboration recommendation based upon a degree of correlation between the subsequent actions performed by the other users that received the user-initiated interaction request and the intended interaction result of the user-initiated interaction request represented within the collaboration model.

6. The system of claim 5, where, in being programmed to determine whether the subsequent actions performed by the other users that received the user-initiated interaction request correlate to the intended interaction result of the user-initiated interaction request, the processor is programmed to determine, from text analysis of electronic communications initiated by the other users after receipt of the user-initiated interaction request, whether the other users performed actions consistent with the intended interaction result of the user-initiated interaction request.

7. The system of claim 5, where, in being programmed to determine whether the subsequent actions performed by the other users that received the user-initiated interaction request correlate to the intended interaction result of the user-initiated interaction request, the processor is programmed to determine, from text analysis of a subsequent electronic communication initiated by the user after receipt of an electronic communication response from at least one of the other users, whether the electronic communication response influenced the user that sent the user-initiated interaction request.

8. The system of claim 5, where, in being programmed to generate on the display, in accordance with the determined correlations between the subsequent actions performed by the other users that received the user-initiated interaction request and the intended interaction result of the user-initiated interaction request, the visual representation of the collaboration model that identifies the probabilities of successful collaborations between the user and the other users, the processor is programmed to:

generate on the display one of a graphical representation of the collaboration model and a table, where the generated one of the graphical representation of the collaboration model and the table identifies information within the collaboration model.

9. A computer program product, comprising:

a computer readable storage medium having computer readable program code embodied therewith, where the computer readable storage medium is not a transitory signal per se and where the computer readable program code when executed on a computer causes the computer to:

determine, based on an analysis of subsequent actions performed by other users that received a user-initiated interaction request, whether the subsequent actions performed by the other users that received the user-initiated interaction request correlate to an intended interaction result of the user-initiated interaction request;

create a collaboration model by correlating identified collaboration metrics that specify probabilities of success of future collaboration between the user and the other users that received the user-initiated interaction request;

generate on the display, in accordance with determined correlations between the subsequent actions performed by the other users that received the user-initiated interaction request and the intended interaction result of the user-initiated interaction request, a visual representation of the collaboration model that correlates the probabilities of success of the future collaborations between the user and the other users; and provide, in association with the visual representation of the collaboration model, a collaboration recommendation based upon a degree of correlation between the subsequent actions performed by the other users that received the user-initiated interaction request and the intended interaction result of the user-initiated interaction request represented within the collaboration model.

10. The computer program product of claim 9, where, in causing the computer to determine whether the subsequent actions performed by the other users that received the user-initiated interaction request correlate to the intended interaction result of the user-initiated interaction request, the computer readable program code when executed on the computer causes the computer to determine, from text analysis of electronic communications initiated by the other users after receipt of the user-initiated interaction request, whether the other users performed actions consistent with the intended interaction result of the user-initiated interaction request.

11. The computer program product of claim 9, where, in causing the computer to determine whether the subsequent actions performed by the other users that received the user-initiated interaction request correlate to the intended interaction result of the user-initiated interaction request, the computer readable program code when executed on the computer causes the computer to determine, from text analysis of a subsequent electronic communication initiated by the user after receipt of an electronic communication response from at least one of the other users, whether the electronic communication response influenced the user that sent the user-initiated interaction request.

12. The computer program product of claim 9, where, in causing the computer to generate, in accordance with the determined correlations between the subsequent actions performed by the other users that received the user-initiated interaction request and the intended interaction result of the user-initiated interaction request, the visual representation of the collaboration model that identifies the probabilities of successful collaborations between the user and the other users, the computer readable program code when executed on the computer causes the computer to:

generate one of a graphical representation of the collaboration model and a table, where the generated one of the graphical representation of the collaboration model and the table identifies information within the collaboration model.

\* \* \* \* \*